J. W. GAMBLE.
WATER MEASURING APPARATUS.
APPLICATION FILED DEC. 6, 1913.
1,184,437.
Patented May 23, 1916.
Fig. 1,
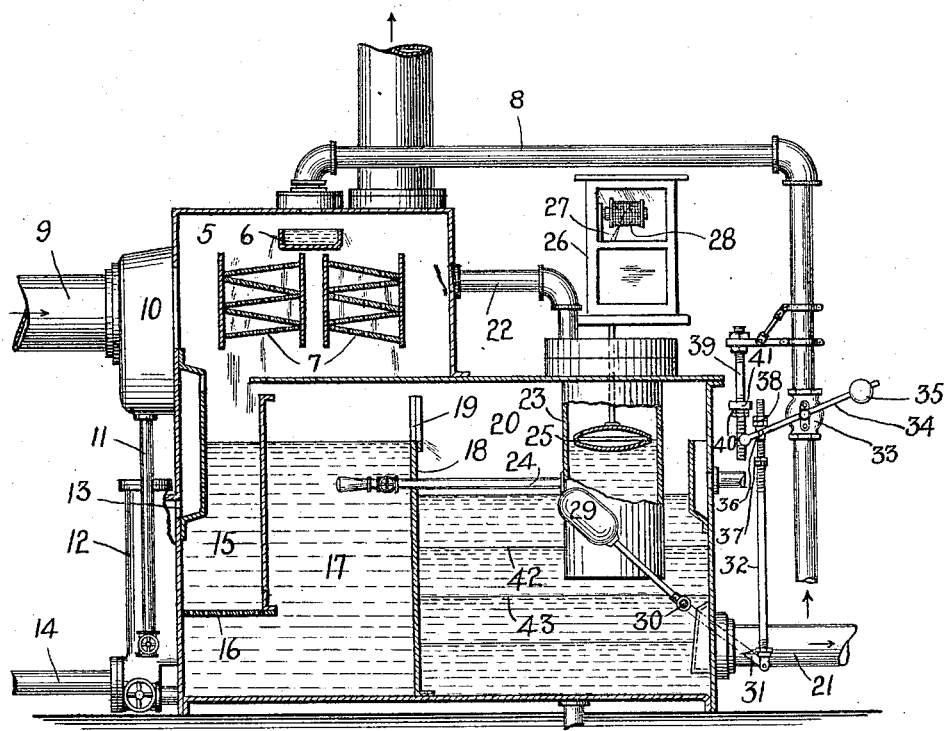
Fig. 2,
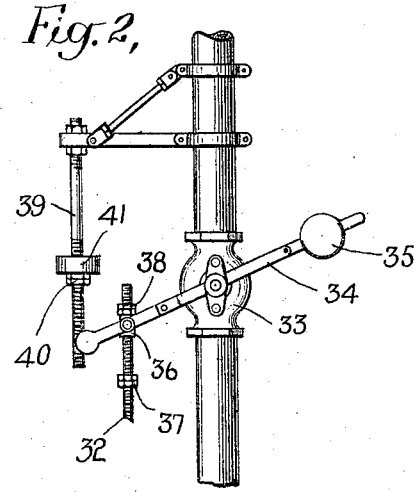
Fig. 3.
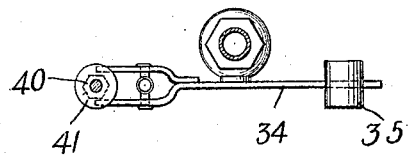
WITNESSES
J. McIntosh
H. Nackenhorst.
INVENTOR
Joseph W. Gamble
BY
Edwards & Edwards
ATTORNEYS

UNITED STATES PATENT OFFICE.

JOSEPH W. GAMBLE, OF PHILADELPHIA, PENNSYLVANIA, ASSIGNOR TO HARRISON SAFETY BOILER WORKS, OF PHILADELPHIA, PENNSYLVANIA, A COPARTNERSHIP OF PENNSYLVANIA.

WATER-MEASURING APPARATUS.

1,184,437.     Specification of Letters Patent.     Patented May 23, 1916.

Original application filed October 28, 1913, Serial No. 797,737. Divided and this application filed December 6, 1913. Serial No. 804,982.

*To all whom it may concern:*

Be it known that I, JOSEPH W. GAMBLE, a citizen of the United States, residing at Philadelphia, in the county of Philadelphia and State of Pennsylvania, have invented certain new and useful Improvements in Water-Measuring Apparatus, of which the following is a specification.

This invention relates to apparatus for measuring the flow of water and is of particular utility in a steam-generating apparatus for measuring water supplied from a preliminary heater to a boiler. The measuring apparatus is of the type employing two chambers, an approach or still-water chamber and an outboard or discharge chamber, and a weir between the two chambers over which the water flows from one to the other, the measurements being made by measuring the head of water with respect to the notch in the weir. The measuring apparatus is preferably used in conjunction with a feed-water heater of the open type and for this purpose, the measuring apparatus may be combined with the heater in a unitary structure, or may be made as a separate piece of apparatus and connected to the heater by a suitable pipe.

The present invention is directed more particularly to mechanism for controlling the admission of water to the heater and from it to the measuring apparatus or directly to the measuring apparatus. The admission of such water is controlled automatically by changes of the level of the water in the outboard or discharge chamber of the measuring apparatus, such changes occurring when water is drawn off to be supplied to the boiler. When such controlling means is employed, undue fluctuation of the level of the water in the outboard chamber is apt to occur because of the interval of time elapsing between the passage of water past the inlet valve and the arrival of that water in the outboard chamber, and such undue fluctuations detract from the accuracy of the measurements obtained and also require that the apparatus be of larger size and higher cost and occupy more space than is desirable.

In an application for patent filed by me on October 28, 1913, and serially numbered 797,737, I disclosed mechanism for compensating for the time interval elapsing after the admission of water to the apparatus and prior to the time when that water becomes effective upon the controlling devices, such mechanism involving means for increasing the rate of admission of water as the level of the water in the outboard chamber falls to a predetermined point, then maintaining the rate of admission of water substantially constant while said level falls to a lower point and thereafter further increasing the rate of admission of water as the level of the water in the outboard chamber falls.

The present application is a division of the application above mentioned and the invention involves the provision of a special form of apparatus for regulating the supply of water to the measuring apparatus in the manner described in that application.

In accordance with the present invention, a single valve is employed in the water supply pipe and the connection to the movable member of this valve from the float in the outboard chamber is arranged to provide for a limited amount of lost motion. As a result of this construction, the valve controlling the inlet of water is opened more and more as the level of the water in the outboard chamber falls to a predetermined point, then remains substantially stationary while that level falls farther and thereafter will be opened to a greater extent as the level in the outboard chamber falls so as to further increase the rate of supply of water. This valve mechanism is provided with means whereby adjustments may be made so that the changes in the rate of supply of the water admitted to the apparatus will be made at the points desired when the level in the outboard chamber changes.

The preferred embodiment of the invention is illustrated in the accompanying drawings, in which—

Figure 1 is a sectional elevation of a combined feed-water heater and measuring apparatus, Fig. 2 is a detail view of the valve mechanism and Fig. 3 is a detail view in horizontal section of the apparatus shown in Fig. 2.

Referring to these drawings, a feed-water heater of the open type is shown at 5. This heater consists of a chamber having a distribution box 6 and a plurality of inclined trays 7 mounted therein. The water supply pipe 8 admits water to the top of the heater so that it is delivered into the box 6 from which it overflows upon the trays 7. Steam is admitted to the heater through the pipe 9 which is connected to a separator 10 for catching oil and water. From the separator 10, oil and water caught thereby drip through a pipe 11 into a trap 12 which is connected to the heater by an opening 13. This trap 12 controls the passage of the drip from the separator 10 and the overflow from the heater to waste through a pipe 14. The water heated by the steam rising around the trays 7 accumulates in a chamber 15 at the bottom of the heater 5, which chamber has a perforated baffle 16 at the bottom thereof. The water passing through the baffle 16 accumulates in an approach or still-water chamber 17 having a wall 18 at one side thereof which is provided with one or more notches 19 and constitutes a weir over which water may overflow from the approach chamber 17 to a second chamber 20 known as the outboard or discharge chamber. Water may be drawn off from the chamber 20 through an outlet pipe 21, which pipe may lead to the boiler feeding devices. Preferably a pipe 22 connects the heater 5 and the chamber 20 so that the pressure within these two will be the same at all times.

A cylindrical chamber or receptacle 23 is suspended within the chamber 20 and is connected by means of a pipe 24 with the chamber 17 so that the level of the water in the receptacle 23 is always the same as the level within the chamber 17. In this receptacle 23 is a float 25 and mounted above the receptacle outside chamber 20 is a recorder 26 whose marking device 27 is connected to the float 25. This marking device is arranged to mark continuously upon a traveling sheet 28, preferably a strip of paper wound around a drum which is driven by a time train.

The recording device is shown diagrammatically merely, the same being of a known or usual type. It should be understood that when the paper on which the record is made is wound around a drum mounted on a horizontal axis, as shown, the drum being rotated by clockwork, the up and down movement of the float 25 may be caused to move the marker 27 axially of the drum by any suitable connection, to give the desired record. Or any other suitable recording device may be used, actuated by float 25.

The inlet of water to the apparatus through the pipe 8 is automatically controlled by changes of the level of the water in the outboard chamber. For this purpose, a float 29 is provided mounted upon a rod 30 which extends through the side of the chamber and is provided with a crank 31 connected by a connecting rod 32 to the valve mechanism. The pipe 8 for admitting water to the heater is provided with a valve 33, preferably of the type known as a chronometer valve; that is, a valve having a rotatable member mounted in a stationary member, ports in the one being alined with ports or a port in the other as the movable member is rotated, to give an increasingly larger area of passageway through the valve as the movable member is rotated farther in the opening direction. The movable member of this valve has a rod 34 connected thereto which rod is weighted at one end as shown at 35. The opposite end of this rod is pivotally connected to a sleeve 36 which slides freely upon the upper threaded end of the rod 32. Nuts 37 and 38 are provided on this threaded end of rod 32 against which the sleeve 36 abuts and between which that sleeve may move freely. A rod 39 is suspended stationarily in any suitable manner adjacent to the rod 32. The lower end of this rod 39 is threaded to receive nuts 40 which position a collar 41 loosely mounted upon the rod 39. The rod 34 is extended beyond the sleeve 36 and its end is adapted to engage the collar 41. Preferably this end of rod 34 is bifurcated as shown in Fig. 3.

The operation of the valve so constructed will now be described. When the float 29 moves downwardly from the position in which it is shown in Fig. 1, it causes the rod 32 to be moved upwardly. At this time, the sleeve 36 is held against the nuts 38 by the weight 35 and the valve 33 is closed. As rod 32 moves upwardly carrying nuts 38 with it, the weight 35 turns the movable member of valve 33 to open the valve more and more as the float 29 falls. When the float moves downwardly to the level indicated by the line 42, the end of rod 34 engages the collar 41 which constitutes a weight sufficient to arrest movement of the valve-member actuated by weight 35. Therefore, as the float 29 moves downwardly from the level 42 to the level indicated by the line 43, the movable member of valve 33 remains substantially stationary, the rod 32 sliding through the collar 36. When float 29 reaches line 43, the nuts 37 come into engagement with collar 36. If the float 29 moves downwardly farther, the nuts 37 on rod 32 acting on collar 36 cause the rod 34 to be moved lifting the weight 41 with it and thus opening the valve 33 to a further extent.

It will thus be seen that by means of a single valve in a single water supply pipe, the rate of admission of water to the heating and measuring apparatus is automatically regulated in the desired manner in response to changes of the level of the water in the outboard chamber. The movable member of the valve has a discontinuous movement as the float in the outboard chamber moves continuously by reason of the provision for lost motion in the connection from the float to the movable valve member, and it automatically effects the desired changes in the rate of admission of water. Predetermined points are selected by the adjustment of the apparatus at which these changes in the rate of admission take place. These changes are such that a zone is established through which the level of the water in the outboard chamber may move without materially affecting the rate of supply of water to the apparatus, but when the level of the water in the outboard chamber is either below or above this zone, the rate of supply of water will be changed constantly as the level in the outboard chamber changes.

If it be desired to effect changes in the positions of the points at which changes in the rate of inflow of water occur, this may be done by changing the positions of the nuts 37 and 38 on the rod 32 and of the nuts 40 on rod 39.

In the drawings, I have shown the measuring apparatus as combined with an open feed-water heater in a unitary structure. Such a measuring apparatus is frequently employed in this manner, but the invention is in no way limited in this respect for the measuring apparatus may be made as a unit wholly independent of the heater and may be used with or without a heater. If a heater be used in conjunction with, though separate from the measuring apparatus, the automatically controlled valve herein described may be provided for controlling the admission of water to the heater or for controlling the passage of water from the heater to the measuring apparatus.

Having described my invention, what I claim as new therein and desire to secure by Letters Patent of the United States is:

1. The combination of a receptacle having two chambers, a weir between them, an inlet pipe connected to the first chamber, a valve therein having a movable valve member, means controlled by the water in the second chamber for moving the movable member of the valve as the level of the water in the second chamber changes and means for holding said member substantially stationary when said level is between predetermined limits, and means for withdrawing water from the second chamber, substantially as set forth.

2. The combination of a receptacle having two chambers, a weir between them, an inlet pipe connected to the first chamber, a valve therein, a float in the second chamber, a connection from the float to the movable member of the valve for moving said member during a portion of the movement of the float, said connection permitting said member to remain at rest when the float is moving between certain limits intermediate of its range of movement, means for retaining said member at rest between such limits and a pipe for withdrawing water from the second chamber, substantially as set forth.

3. The combination of a receptacle having two chambers, a weir between them, an inlet pipe connected to the first chamber, a valve therein, a float in the second chamber, a connection from the float to the movable member of the valve having provision for lost motion therein, means for adjusting the amount of said lost motion, and a pipe for withdrawing water from the second chamber, substantially as set forth.

4. The combination of a receptacle having two chambers, a weir between them, an inlet pipe connected to the first chamber, a valve therein having a movable valve member, means for moving the movable member of the valve as the level of the water in the second chamber changes and means for holding said member substantially stationary when said level is between predetermined limits, means for effecting an adjustment of said limits, and a pipe for withdrawing water from the second chamber, substantially as set forth.

5. The combination of a receptacle having two chambers, a weir between them, an inlet pipe connected to the first chamber, a valve therein having a movable member, a float in the second chamber, a connection from the float to the movable member of the valve and means coöperating therewith whereby the movable member is actuated with a movement discontinuous with that of the float as the latter moves in either direction, and a pipe for withdrawing water from the second chamber, substantially as set forth.

6. The combination of a receptacle having two chambers, a weir between them, an inlet pipe connected to the first chamber, a valve therein having a movable valve member, means for moving the movable member of the valve as the level of the water in the second chamber falls to a predetermined point, means for holding said member substantially stationary when said level is between said point and a lower point and means for moving said member as said level falls below said last-named point, and a pipe for withdrawing water from said second chamber, substantially as set forth.

7. The combination of a receptacle having two chambers, a weir between them, an inlet pipe connected to the first chamber, a valve therein having a movable valve member, means for moving the movable member of the valve as the level of the water in the second chamber falls to a predetermined point, means for holding said member substantially stationary when said level is between said point and a lower point and means for moving said member as said level falls below said last-named point, means for effecting an adjustment of the position of said points, and a pipe for withdrawing water from said second chamber, substantially as set forth.

8. The combination of a receptacle for liquids having means for measuring a head of water therein, an inlet pipe connected thereto, a valve therein having a movable valve-member, a float in said receptacle, connections from the float to the movable valve-member arranged to actuate the movable member with a movement discontinuous with that of the float as the latter moves either up or down, and a pipe for withdrawing water from said receptacle, substantially as set forth.

9. The combination of a receptacle for liquids having means for measuring a head of water therein, an inlet pipe connected thereto, a valve therein having a movable valve member, a float in said receptacle, lever means connected to said movable valve member tending to open the same, a loose connection between said float and lever means, permitting said movable valve-member to have an opening movement while said float is sinking between predetermined limits, and means for restraining further opening movement of said movable valve-member while said float is sinking between lower limits in said receptacle, substantially as set forth.

10. The combination of a receptacle for liquids having means for measuring a head of water therein, an inlet pipe connected thereto, a valve therein having a movable valve-member, a float in said receptacle, a lever connected to said movable valve member, a link coacting with said lever, and operative connections between said float and link, said parts being so arranged that continuous movement of said float in one direction causes a discontinuous movement of said movable valve member, substantially as set forth.

This specification signed and witnessed this 3 day of December, 1913.

JOSEPH W. GAMBLE.

Witnesses:
ROBERT G. CLIFTON,
M. M. S. FULTON, Jr.

Copies of this patent may be obtained for five cents each, by addressing the "Commissioner of Patents, Washington, D. C."